United States Patent
Kruger et al.

(10) Patent No.: US 7,281,922 B2
(45) Date of Patent: Oct. 16, 2007

(54) CONTINUOUS PALLET PRODUCTION APPARATUS

(75) Inventors: Paul A. Kruger, Norman, OK (US); Bryan R. Kirchmer, Tulsa, OK (US)

(73) Assignee: Commerce Limited Partnership, Norman, OK (US)

( * ) Notice: Subject to any disclaimer, the term of this patent is extended or adjusted under 35 U.S.C. 154(b) by 137 days.

(21) Appl. No.: 10/401,179

(22) Filed: Mar. 27, 2003

(65) Prior Publication Data

US 2004/0070115 A1  Apr. 15, 2004

Related U.S. Application Data

(60) Provisional application No. 60/368,490, filed on Mar. 27, 2002.

(51) Int. Cl.
B29C 45/22 (2006.01)
B29C 45/66 (2006.01)

(52) U.S. Cl. ............... 425/588; 264/297.2; 264/328.8; 425/595

(58) Field of Classification Search ............. 264/297.2, 264/297.8, 328.8; 425/595, 328.8, 588
See application file for complete search history.

(56) References Cited

U.S. PATENT DOCUMENTS

| | | | |
|---|---|---|---|
| 3,353,209 A * | 11/1967 | Schad | 425/145 |
| 3,466,700 A * | 9/1969 | Harrison | 425/129.1 |
| 4,242,073 A | 12/1980 | Tsuchiya et al. | |
| 4,372,910 A * | 2/1983 | Stroup et al. | 264/532 |
| 4,390,332 A | 6/1983 | Hendry | |
| 4,865,534 A * | 9/1989 | Hehl | 425/547 |
| 4,990,299 A * | 2/1991 | Sorensen | 264/297.4 |
| 5,052,909 A | 10/1991 | Hertzer et al. | |
| 5,324,192 A * | 6/1994 | Zakich | 425/575 |
| 5,542,465 A | 8/1996 | Wolniak | |
| 5,643,620 A | 7/1997 | Brun, Jr. | |
| 5,863,485 A * | 1/1999 | Groleau | 264/328.1 |
| 5,928,596 A | 7/1999 | McLeod et al. | |
| 6,241,508 B1 | 6/2001 | John et al. | |
| 6,477,878 B2 * | 11/2002 | Bisaillon et al. | 72/105 |

* cited by examiner

Primary Examiner—Jill L. Heitbrink
(74) Attorney, Agent, or Firm—Crowe & Dunlevy, P.C.

(57) ABSTRACT

Disclosed is an injection molding apparatus that includes an extruder configured to produce a continuous flow of molten plastic. The injection molding apparatus also includes a plurality of mold assemblies and a delivery system that provides an uninterrupted transfer of the continuous flow of molten plastic from the extruder to the plurality of mold assemblies. The present invention also includes an process for using the injection molding apparatus that includes forcing a continuous flow of molten plastic into a delivery system and sequentially routing the continuous flow of molten plastic from the delivery system into a plurality of mold assemblies without interruption.

6 Claims, 4 Drawing Sheets

CONTINUOUS PALLET PRODUCTION APPARATUS

RELATED APPLICATIONS

This application claims the benefit of U.S. Provisional Patent Application No. 60/368,490 filed Mar. 27, 2002, entitled Continuous Production of Plastic Pallets, which is hereby incorporated by reference.

FIELD OF THE INVENTION

The present invention relates generally to the field of injection and structural foam molding and more particularly to an apparatus and method for producing plastic pallets or similar injection molded articles.

BACKGROUND OF THE INVENTION

High and low pressure injection molding devices are well-known in the art for their use in producing plastic components. In conventional injection or structural foam molding machines, liquified plastic is produced by an extruder and transferred to one or more accumulators. The accumulators then force the molten plastic into a mold that includes a cavity designed to produce a selected part. Often, the mold is a "split mold" which includes two portions that separate to facilitate the removal of the formed part.

It is known in the prior art to couple multiple mold stations to a single extruder. To accommodate multiple molds, prior art designs make use of resin accumulators and injectors. For example, U.S. Pat. No. 6,241,508 B1 issued Jun. 5, 2001, to John et al., and commonly assigned with the present invention, discloses a multiple mold workstation with a single injection feeder and hydraulic pumping station. U.S. Pat. No. 6,241,508 B1 teaches the use of a resin accumulator and injection unit for each separate mold station. The resin accumulator employs a hydraulically driven piston that has a step-down reduction chamber to increase the pressure of the molten plastic as it is injected into the mold station.

Although widely used, accumulators of the type disclosed in U.S. Pat. No. 6,241,508 B1 increase the overall residence time of the molten plastic in the injection molding equipment. As such, additional energy must be consumed to maintain the molten state of the plastic during the extended residence time. Heater bands are commonly employed to maintain the temperature of the molten plastic between the extruder and the mold.

Another deficiency in the prior art is the limited versatility of conventional injection molding equipment. Prior art fixed-volume accumulators are configured to retain and deliver a quantity of molten plastic ("shot size") based on the specific capacity of individual molds. Accordingly, it is difficult to change molds without also modifying the accumulators to accommodate different shot sizes. Too much plastic will make the mold "flash" open, and too little will create formation and ejection problems.

Yet another deficiency in the prior art is the inefficient method by which a split mold is held in a closed position during the injection process. Clamping pressure is required to oppose the internal pressures developed within the mold cavity. In the past, suitable clamping pressure is obtained through use of a hydraulically powered ram. Although effective, maintaining the clamping pressure through the continuous application of hydraulic pressure is energy intensive and inefficient.

In light of the foregoing deficiencies of the prior art, there is a need for more energy efficient injection molding equipment and methods.

SUMMARY OF THE INVENTION

The present invention includes an injection molding apparatus that includes an extruder configured to produce a continuous flow of molten plastic. The injection molding apparatus also includes a plurality of mold assemblies and a delivery system that provides an uninterrupted transfer of the continuous flow of molten plastic from the extruder to the plurality of mold assemblies. The present invention also includes an process for using the injection molding apparatus that includes forcing a continuous flow of molten plastic into a delivery system and sequentially routing the continuous flow of molten plastic from the delivery system into a plurality of mold assemblies without interruption.

DETAILED DESCRIPTION OF THE PREFERRED EMBODIMENT

As disclosed herein, the present invention is embodied in an apparatus and method that are configured for the production of plastic parts. In a particularly preferred embodiment, the apparatus and method are configured to produce plastic pallets. It will be understood that the term "plastic," as used herein, refers to resins, polymers, structural foams, waxes and similar materials, in addition to any ordinary meaning assigned the term. It will also be understood that, as used herein, the terms "injection molding" refer to high and low pressure molding operations using any suitable material, including plastics. The term "molten plastic" refers to any fluidized plastic, including plastic that has been softened through thermal or chemical processes.

Figure 1:
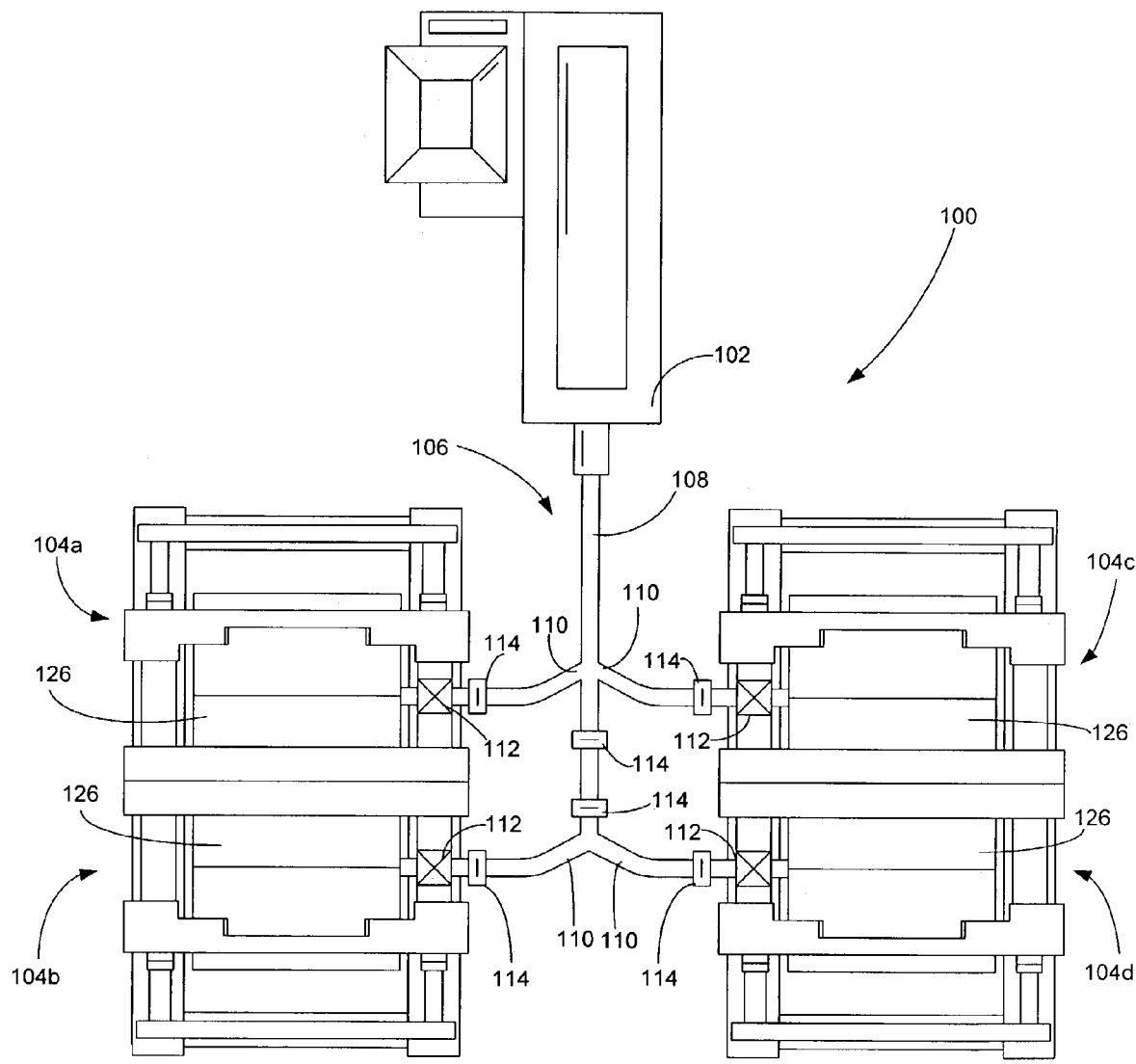
FIG. 1 is a view of an injection molding apparatus constructed in accordance with a preferred embodiment of the present invention.

Beginning with FIG. 1, shown therein is a top view of a presently preferred embodiment of an injection molding apparatus 100. As shown in FIG. 1, the injection molding apparatus 100 includes an extruder 102 and four mold assemblies 104a, 104b, 104c and 104d (collectively "mold assemblies 104"). As shown, the mold assemblies 104 are configured in pairs such that mold assemblies 104a and 104b are grouped together and mold assemblies 104c and 104d are grouped together.

The injection molding apparatus 100 also includes a delivery system 106 that connects the extruder 102 to the mold assemblies 104. The delivery system 106 preferably includes a main pipe 108, feeder pipes 110, a plurality of valves 112 and a plurality of heater bands 114. Preferably, a number of heater bands 114 are placed throughout the delivery system 106. Unlike prior art injection molding equipment, the delivery system 106 does not make use of one or more accumulators that hold a volume of molten plastic and then force the volume of molten plastic into a mold assembly with a piston. In the preferred embodiment, molten plastic is forced into the mold assemblies 104 under pressure generated by the extruder 102. Accordingly, the delivery system 106 can provide an uninterrupted flow of molten plastic from the extruder 102 to the mold assemblies 104 without increasing the pressure of the molten plastic through use of auxiliary pumps or pistons.

The valves 112 control the flow of molten plastic from the main pipe 108 and feeder pipes 110 to the mold assemblies 104. The heater bands 114 are disposed on the main pipe 108 and feeder pipes 110 at selected locations. Preferably, the heater bands 114 are disposed throughout the delivery system 106. The heater bands 114 are capable of providing sufficient heat to maintain the molten state of the plastic resin during the residence time in the delivery system 106. Proper controls are preferably used to automate the operation of the valves 112 and heater bands 114.

Continuing with FIG. 1, each pair of mold assemblies 104 is preferably configured for back-to-back connection. Alternate arrangements of the mold assemblies 104 are encompassed within the scope of the present invention. Furthermore, although four mold assemblies 104 are presently preferred, additional or fewer mold assemblies 104 could also be employed.

Figure 2:
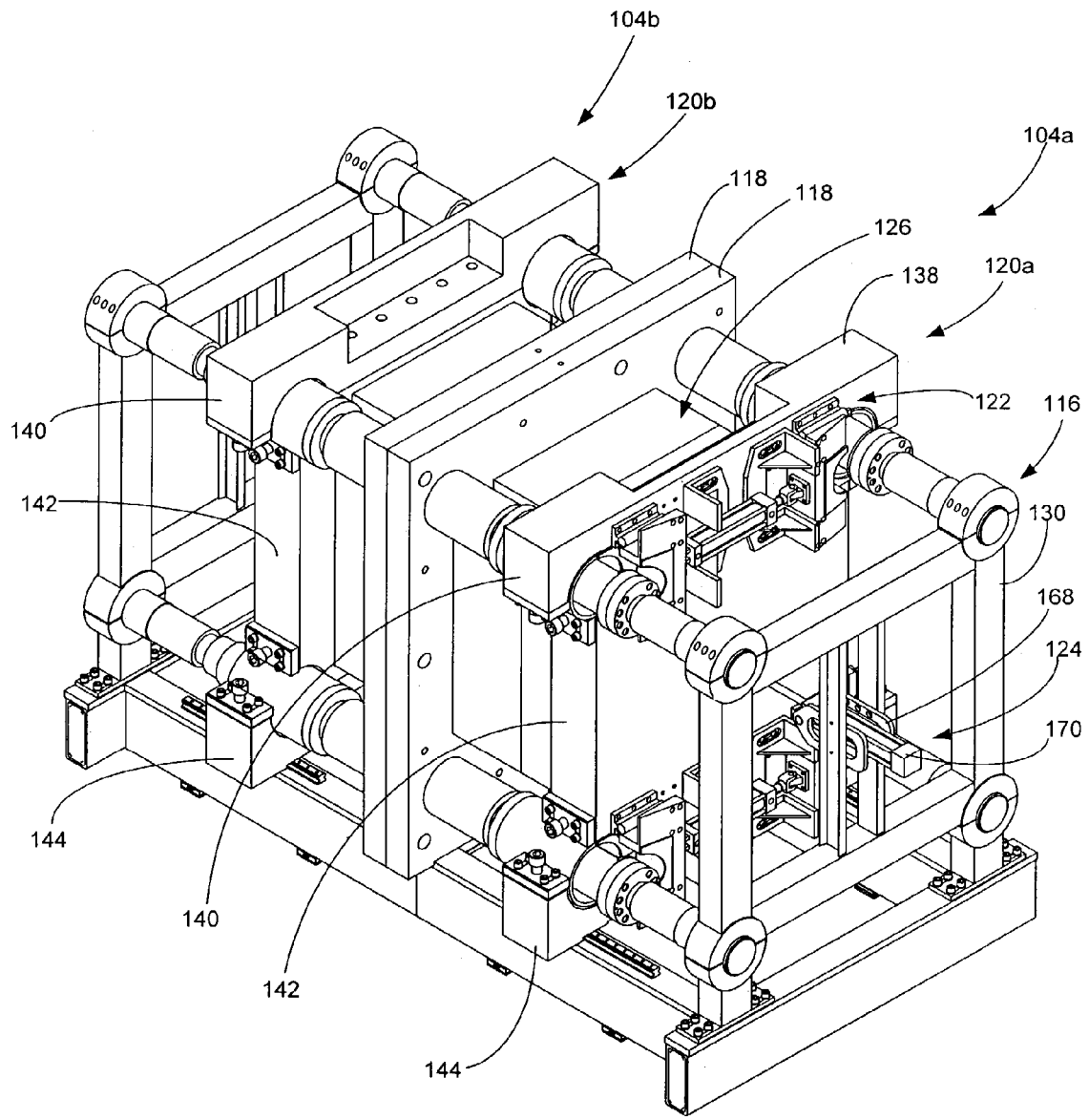
FIG. 2 is a perspective view of a mold assembly of the injection molding apparatus of FIG. 1.

Turning to FIG. 2, shown therein is a perspective view of a pair of mold assemblies 104 constructed in accordance with a preferred embodiment of the present invention. Each mold assembly 104 preferably includes a frame assembly 116, a stationary platen 118, a dynamic platen 120, a locking assembly 122, a dynamic platen movement assembly 124 and a split mold 126. Unless otherwise specified, each component described herein is preferably constructed from steel, stainless steel, aluminum or other suitable metal or metal alloy.

In the presently preferred embodiment, the split molds 126 are constructed from aluminum, but other suitable materials, such as steel, may also be used. It is also preferred that each split mold 126 include a "hot runner" manifold with a plurality of control valves (not visible) that effectively distribute the molten plastic throughout the split mold 126 during the injection process. The control valves control the flow of molten plastic from the hot runner manifold to the interior of the split mold 126. The control valves can be needle valves that are hydraulically or pneumatically actuated. It is also preferred that the split mold 126 be outfitted with hydraulic or pneumatic ejector bars to facilitate removal of the part at the conclusion of the injection process.

Figure 3:
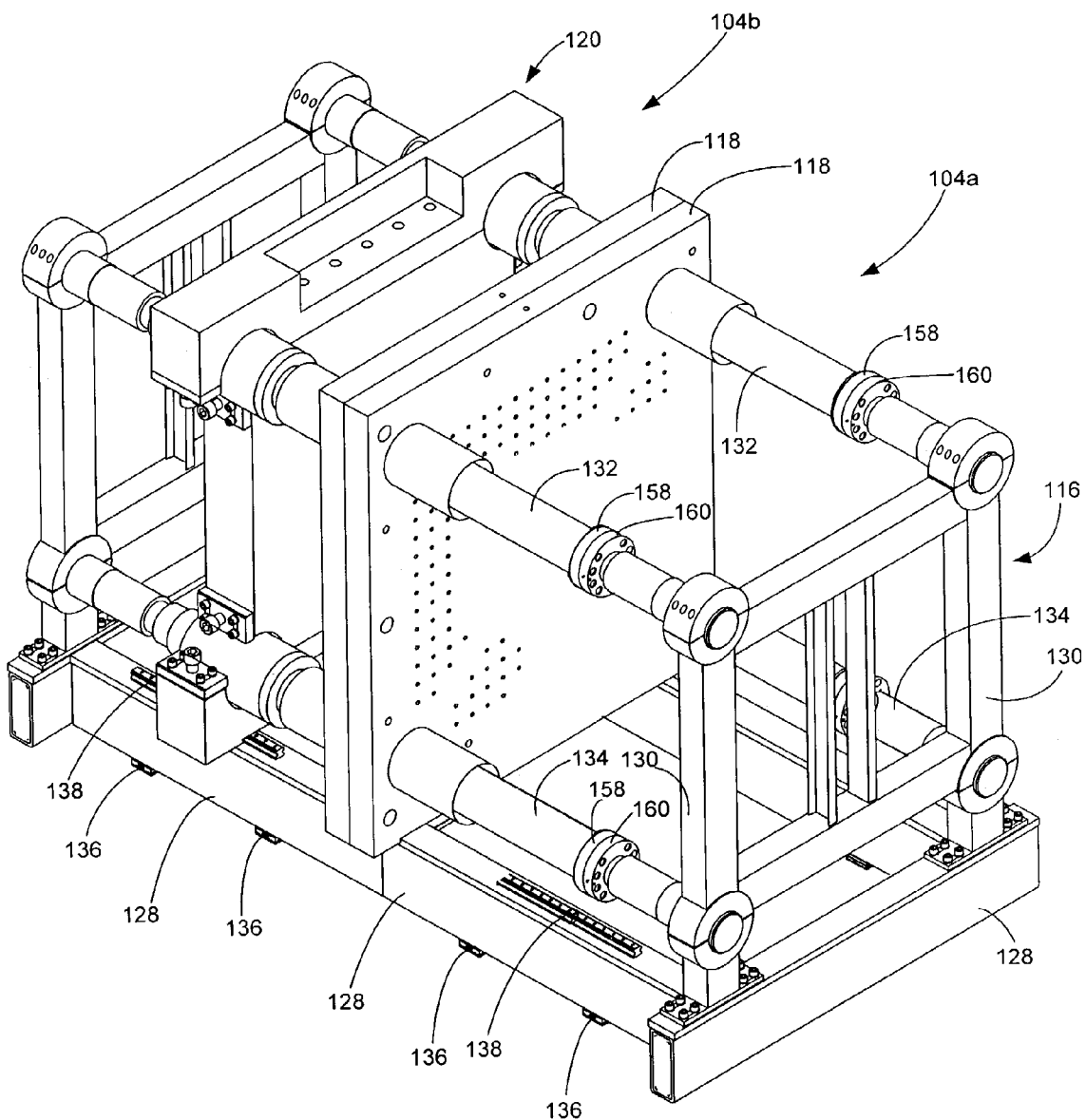
FIG. 3 is a perspective view of a mold assembly of FIG. 2.

Turning to FIG. 3, shown therein is the pair of mold assemblies 104a and 104b of FIG. 2. For clarity, the dynamic platen 120, locking assembly 122, dynamic platen movement assembly 124 and split mold 126 have been removed from the mold assembly 104a in FIG. 3. FIG. 3 demonstrates the interrelation between the frame assembly 116 and the stationary platen 118.

The frame assembly 112 includes a base frame 128, a vertical frame 130, upper tie rods 132 and lower tie rods 134. The base frame 128 is preferably constructed from a series of connected steel members that are configured to support the weight of the stationary platen 118, dynamic platen 120 and split mold 126. The base frame 128 includes a plurality of rails 138 that are configured to control the linear movement of the dynamic platen 120 during operation of the injection molding apparatus 100. The base frame 128 optionally includes levelers 136 that can be used to adjust the position of the mold assembly 104 relative to the supporting surface. Suitable levelers are available from the Airloc company of Franklin, Mass.

The upper and lower tie rods 132, 134 connect the stationary platen 118 and the vertical frame 130. The upper and lower tie rods 132, 134 are preferably constructed to accommodate extension during an injection molding operation. In a preferred embodiment, the upper and lower tie rods 132, 134 are preloaded with a compressive force between the stationary platen 118 and the vertical frame 130. To further minimize stretching during an injection molding operation, the upper and lower tie rods 132, 134 can include portions with enlarged diameters (not numerically designated). The larger cross section in these portions reduces the amount of linear deflection experienced by the upper and lower tie rods 132, 134 during use, thereby maximizing clamping resistance.

The stationary platen 118 is configured to support the weight of a portion of the split mold 126 (not shown in FIG. 3). Preferably, the stationary portion of the split mold 126 is attached to the stationary platen 118 through use of a plurality of bolts or supportive flanges. As illustrated in FIG. 3, the stationary platen 118a of mold assembly 104a is also preferably configured for back-to-back connection with the stationary platen 118b of a second mold assembly 104b.

Figure 4:
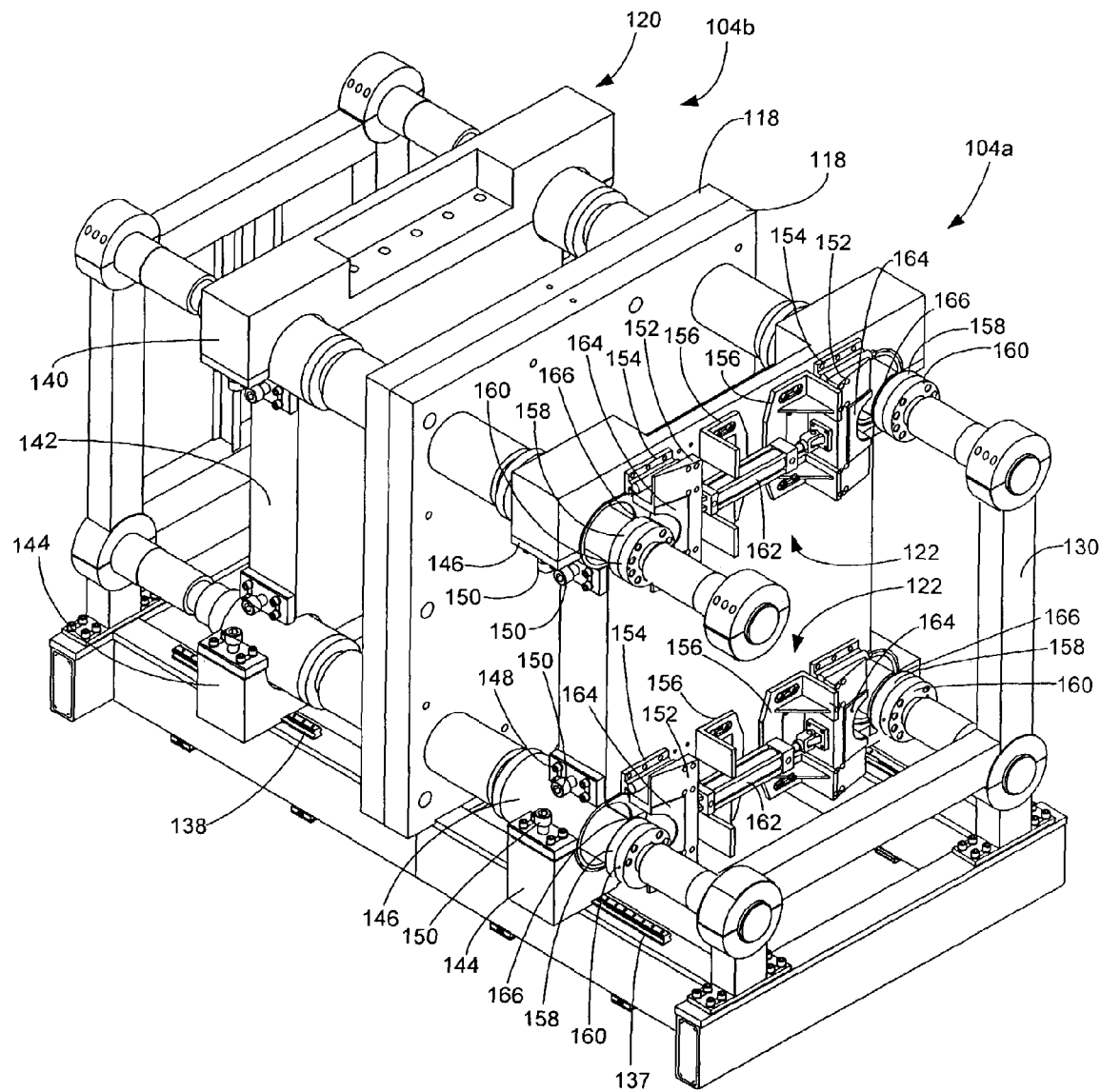
FIG. 4 is a perspective view of a mold assembly of FIG. 2.

Turning now to FIG. 4, shown therein are the mold assemblies 104a, 104b of FIG. 2, with a portion of the frame assembly 116 removed to reveal the construction of the dynamic platen 120 and locking assemblies 122. The dynamic platen 120 preferably includes an upper section 140, a middle section 142 and a lower section 144. Although the dynamic platen 120 is currently constructed from three separate pieces, it will be understood that alternate designs are encompassed within the scope of the present invention. For example, the dynamic platen 120 could be constructed as a single piece.

The dynamic platen 120 is preferably configured to support a portion of the split mold 126. The dynamic platen 120 includes a pillow block bearing that transfers the weight of the split mold 126 and the dynamic platen 120 to the base frame 128 through the rail 138. The pillow block bearing is installed onto the bottom of the lower section 144 and configured for substantially linear movement along the rails 138. In an alternative embodiment, the pillow block bearings are configured as elongated "skates" that are affixed to the dynamic platen lower section 144 and ride along the supporting rails 138. The elongated skates increase the friction generated by movement along the rails 138 but improve the overall stability of the dynamic platen 120.

The dynamic platen 120 also includes a plurality of sleeve assemblies 146. In the presently preferred embodiment, each dynamic platen 120 includes four sleeve assemblies 146. Each sleeve assembly 146 is configured to travel over one of the upper or lower tie rods 132, 134 and is connected to the upper section 140 and middle section 142 or lower section 144 and middle section 142.

Each sleeve assembly 146 includes a plurality of fasteners 148 and position adjusters 150. The fasteners 148 secure the sleeve assembly 146 to the dynamic platen 120. The position adjusters 150 are used to control the position and alignment of the dynamic platen 120 relative to the upper and lower tie rods 132, 134, base frame 128 and stationary platen 118. Preferably, the position adjusters 150 are tuned such that a significant amount of weight is not transferred from the dynamic platen 120 to the base frame 128 through the upper and lower tie rods 132, 134.

Also shown in FIG. 4 are a pair of locking assemblies 122. Each locking assembly 122 includes a wedge assembly 152, a wedge guide 154, a wedge limit bracket 156, an adjustable wedge collar 158, a locking collar 160 and a hydraulic cylinder 162. In the presently preferred embodiment, each locking assembly 122 includes a two wedge assemblies 152, two wedge guides 154, two wedge limit brackets 156, two adjustable wedge collars 158, two locking collars 160 and a single hydraulic cylinder 162. Although a pair of locking assemblies 122 are depicted in FIG. 4, it will be understood that a single locking assembly 122 could also be employed.

The travel of the wedge assemblies 152 is confined by the wedge guides 154, which are preferably mounted to the dynamic platen 120. Each wedge assembly 152 includes a wedge wear surface 164 that is constructed from a durable, wear-resistant material, such as hardened or coated steel.

The wedge assemblies 152 are deployed and retracted along the guides 154 through use of the common hydraulic cylinder 162. Preferably, the hydraulic cylinder 162 is double-acting and not fixed in position relative to the dynamic platen 120. During typical operation, retracting the hydraulic cylinder 162 pulls a first one of the wedge assemblies 152 into contact with its wedge limit bracket 156, which thereby anchors the hydraulic cylinder 162 to enable the retraction of the second wedge assembly 152. In an alternatively preferred embodiment, each wedge assembly 152 is moved by a separate hydraulic cylinder.

An adjustable wedge collar 158 and a locking collar 160 are located on each of the upper or lower tie rods 132, 134. The adjustable wedge collar 158 can be moved along the upper and lower tie rods 132, 134 and fixed in position with the locking collar 160. In a presently preferred embodiment, the locking collar 160 is a split-collar that can be installed, adjusted and removed without disassembling the upper and lower tie rods 132, 134. The adjustable wedge collar 158 is preferably fitted with a chamferred interior face that includes a wear-resistant surface 166. In the presently preferred embodiment, the adjustable wedge collar 158 and locking collar 160 have approximately the same outer diameter and are configured to be admitted within the sleeve assemblies 146 during movement of the dynamic platen 120. This configuration permits the movement of the dynamic platen 120 over the adjustable wedge collar 158 and locking collar 160, thereby significantly reducing the footprint of the mold assemblies 104.

Unlike prior art designs which require the continuous exertion of positive force to the dynamic platen 120 during the injection process, the dynamic platen 120 is "locked" in position by the locking assemblies 122. When the dynamic platen 120 is moved to a position in which the split mold 126 is closed, hydraulic pressure is applied to the hydraulic cylinders 162. Once energized, the hydraulic cylinders 162 force the wedge assemblies 152 from a retracted position into a "clamping" position adjacent the adjustable wedge collars 158. Preferably, the wedge wear surface 164 contacts the collar wear surface 166.

The intrusion of the wedges assemblies 152 against the wedge collars 158 creates a pre-loaded compressive force between the dynamic platen 120 and the stationary platen 118 that is opposed by the locking assemblies 122 and transferred through the upper and lower tie rods 132, 134. Once the desired pre-load is achieved, it is no longer necessary to apply hydraulic pressure to the hydraulic cylinders 162. In this way, force produced by the introduction of plastic into the split molds 126 is opposed by the pre-loaded force between the dynamic and stationary platens 120, 118.

The split mold 108 will only separate, or "flash," when the force generated by the injected plastic exceed the pre-load created by the locking assemblies 122 and the upper and lower tie rods 132, 134 are elongated. Eliminating the need for a continuous clamping force during the injection process significantly reduces the overall power consumption of the injection molding apparatus 100. The ability to move the adjustable wedge collar 158 and locking collar 160 facilitates the adjustment of the stroke of the dynamic platen 120 to accommodate split molds 126 of varying size.

Turning back to FIG. 2, shown therein is the dynamic platen movement assembly 124. The dynamic platen movement assembly 124 includes a frame mount 168 attached to the vertical frame 130 and a hydraulic ram 170 connected to the dynamic platen 120. Preferably, the hydraulic ram 170 is double-acting and capable of moving the dynamic platen from a closed position during the injection process to an open position for removal of the plastic part after formation. Significantly, the use of the locking assemblies 122 reduces the force requirements of the hydraulic ram 170.

With reference to FIG. 1, the presently preferred method of operating the injection molding apparatus 100 is disclosed below. Unlike prior art multiple mold injection designs, the injection molding apparatus 100 does not require the use of accumulators and injectors. Rather, under normal operating conditions, the extruder 102 produces a continuous source of pressurized molten plastic to the mold assemblies 104.

At startup, the extruder 102 is activated and molten plastic is forced at a selected volumetric flow rate into feeder pipes 110 connected to each of the mold assemblies 104. Next, valves 112 in mold assembly 104a are opened and molten plastic begins to fill the split mold 126 without passing through an intervening accumulator or auxiliary pressure generating device. To avoid creating a pressure spike, the valves 112 in mold assembly 104b are opened when the split mold 126a is almost full, thereby allowing molten plastic to simultaneously enter split mold 126b. To further reduce the risk of creating a pressure spike, the volumetric output of the extruder 102 can be decreased as the split mold 126a nears capacity. It will be understood that the operation of the valves 112 can be automated in response to any number of conditions or thresholds, including resin volume, time or injection pressure.

When split mold 126a is filled to the desired extent, the valve 112 in mold assembly 104a is closed, thereby directing the entire output of extruder 102 to mold assembly 104b. As split mold 126b nears capacity, valve 112 in mold assembly 126c are opened, thereby allowing the introduction of molten plastic into the split mold 126c.

This procedure is sequentially repeated until mold assemblies 104c and 104d are also filled. Preferably, the sequence is timed to optimize the production of parts, based on the amount of time required to cool and remove each molded part from the mold assemblies 104. For example, it is desirable to adjust the time required to fill split molds 126b, 126c and 126d to be roughly equivalent to the amount of time required to cool the part in split mold 126a, open the split mold 126a, eject the part and close the split mold 126a. In this way, as split mold 126d is nearly full, mold assembly 126a is ready for the next injection cycle, and the extruder 102 is used to produce a continuous, uninterrupted flow of molten plastic.

The elimination of accumulators reduces the overall residence time of the molten plastic in the delivery system 106 which, in turn, reduces energy consumption and increases output capacity. Additionally, because no fixed-volume accumulators are required, an additional range of "shot-sizes" are available through use of the injection molding apparatus 100. The injection molding apparatus 100 is capable of simultaneously producing different parts from different split molds 126.

It is clear that the present invention is well adapted to carry out its objectives and attain the ends and advantages mentioned above as well as those inherent therein. While presently preferred embodiments of the invention have been described in varying detail for purposes of disclosure, it will be understood that numerous changes may be made which will readily suggest themselves to those skilled in the art and which are encompassed within the spirit of the invention disclosed and as defined in the above text, accompanying drawings and appended claims.

It is claimed:

1. An injection molding apparatus comprising:
   an extruder configured to produce a continuous flow of molten plastic;
   a plurality of mold assemblies, wherein each of the mold assemblies comprise:
      a frame assembly having a base frame and a tie rod;
      a stationary platen supported by the frame assembly;
      a dynamic platen supported by the frame assembly; wherein the dynamic platen has an open position and a closed position;
      a locking assembly comprising a wedge assembly supported by the dynamic platen and an adjustable wedge collar disposed on the tie rod; and
      wherein the dynamic platen is configured to travel over the adjustable wedge collar when the dynamic platen is moved between the closed position and the open position; and
   a delivery system that does not include an accumulator between the extruder and the plurality of mold assemblies.

2. The mold assembly of claim 1, wherein the base frame includes a plurality of rails that support the dynamic platen.

3. The mold assembly of claim 1, wherein the locking assembly further comprises:
   a wedge guide on which the wedge assembly travels, wherein the wedge guide is connected to the dynamic platen; and
   a hydraulic cylinder that is configured to insert and withdraw the wedge assembly into a position adjacent the adjustable wedge collar.

4. The mold assembly of claim 1, wherein the locking assembly further comprises:
   a wedge wear surface on the wedge assembly; and
   a collar wear surface on the adjustable wedge collar, wherein the collar wear surface is configured for repeated contact with the wedge wear surface.

5. The mold assembly of claim 1, wherein the dynamic platen further comprises a top section, a middle section, a bottom section and a plurality of sleeve assemblies that are configured to align the top section, middle section and bottom section.

6. The mold assembly of claim 5, wherein the sleeve assemblies are configured to travel along the tie rod.

* * * * *